May 15, 1934.  P. A. JANSSENS  1,958,480
CAKE DRIER
Filed Sept. 16, 1932   2 Sheets-Sheet 1
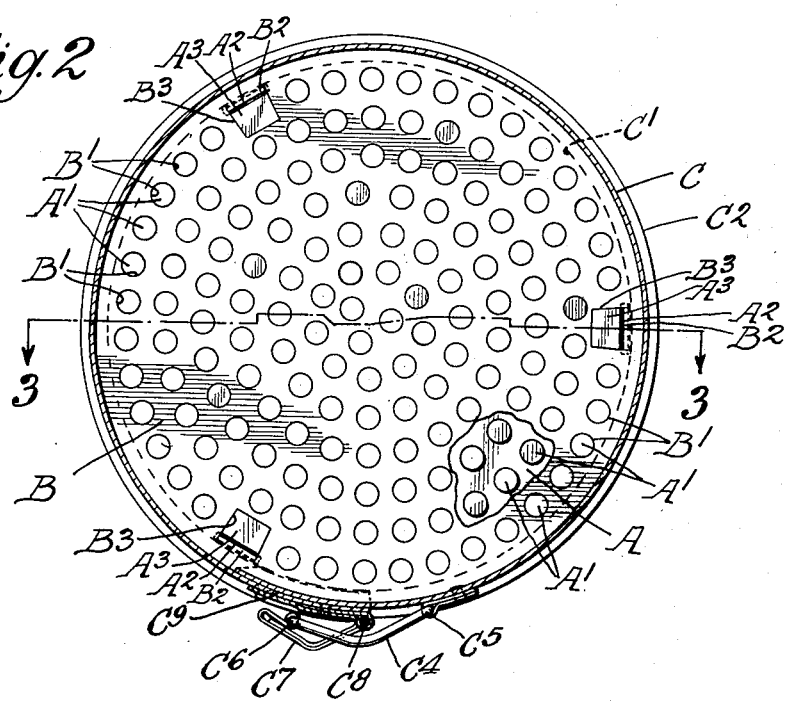
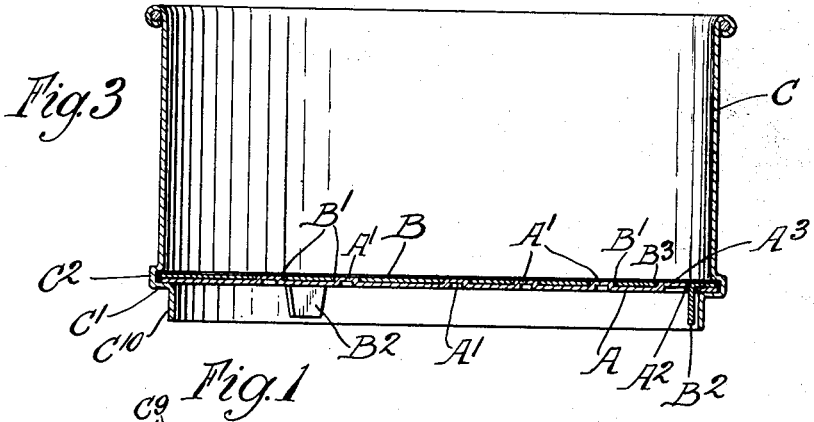
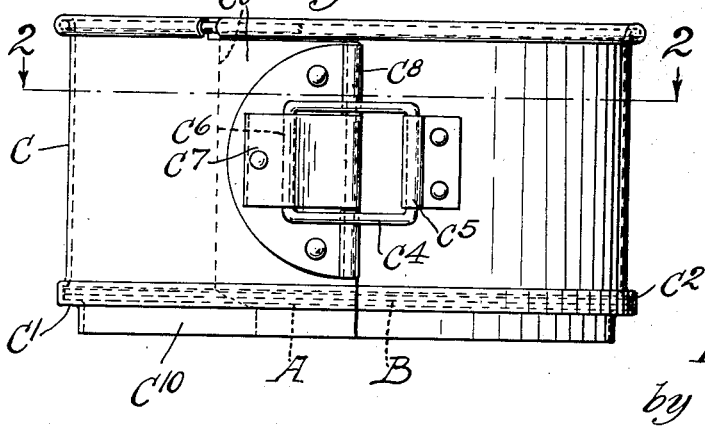
Inventor
Peter A. Janssens
by Parker & Carter
Attorneys.

May 15, 1934.　　　　P. A. JANSSENS　　　　1,958,480
CAKE DRIER
Filed Sept. 16, 1932　　2 Sheets-Sheet 2
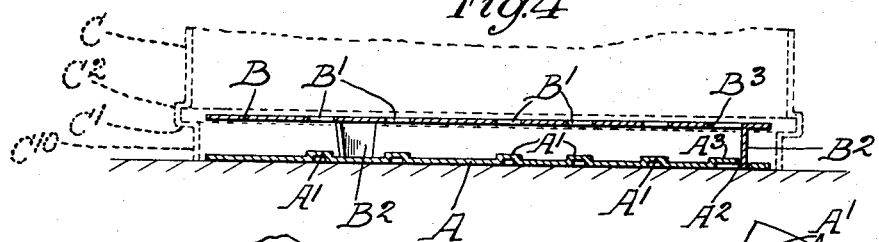
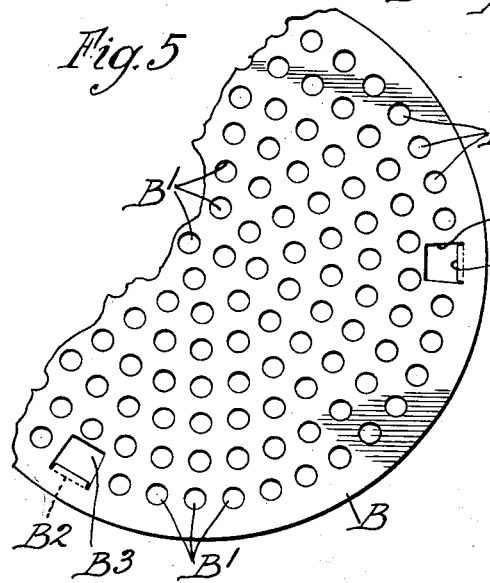
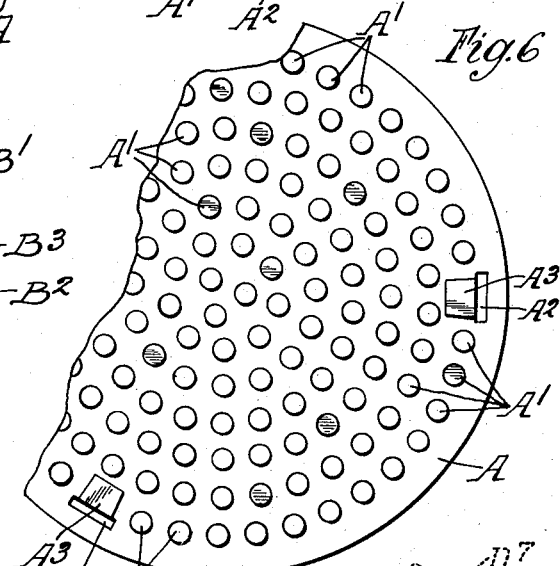
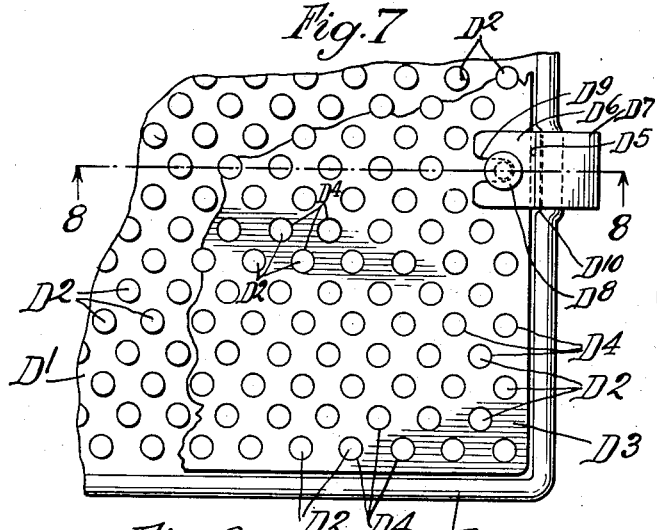
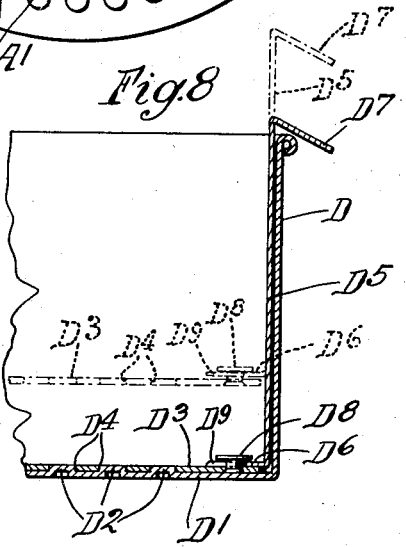
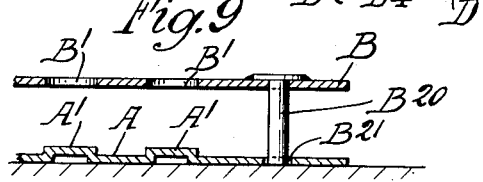
Inventor
Peter A. Janssens
by Parker & Carter
Attorneys.

Patented May 15, 1934

1,958,480

UNITED STATES PATENT OFFICE 1,958,480

CAKE DRIER

Peter A. Janssens, Chicago, Ill.

Application September 16, 1932, Serial No. 633,529

6 Claims. (Cl. 53—6)

My invention relates to an improvement in cooking devices and is shown in connection with an improvement in cake coolers. One object is the provision of a cooking container for a cake which shall be particularly efficient in cooking the cake. Another object is the provision of a cake cooking utensil which shall be effective to permit ready and efficient cooling of the lower part of the cake. Other objects will appear from time to time in the course of the specification and claims.

I illustrate my invention more or less diagrammatically in the accompanying drawings, wherein—

Figure 1 is a side elevation;
Figure 2 is a section on the line 2—2 of Figure 1;
Figure 3 is a section on the line 3—3 of Figure 2;
Figure 4 is a section similar to Figure 3 illustrating the parts in a different position;
Figure 5 is a partial plan view of the upper bottom member as shown in Figure 4;
Figure 6 is a partial plan view of the lower bottom member;
Figure 7 is a view similar to Figure 2 of a variant form of the device;
Figure 8 is a section on the line 8—8 of Figure 7; and
Figure 9 is a detail of a further variation.

Like parts are indicated by like symbols throughout the specification and drawings.

Referring first to the form of Figures 1 to 6, A indicates the bottom member of a cake cooking pan which bottom member is provided with a plurality of upward projections $A^1$, herein shown as terminating with flush tops defining a single plane.

Superposed upon the member A is an upper bottom member B, of the same peripheral shape and provided with apertures $B^1$ properly sized to receive the projections $A^1$. As shown for example in Figure 3, when the members A and B are assembled the upper face of the member B is flush with the upper faces of the members $A^1$ and the parts conform so closely as to provide in effect a flat closed bottom for the pan. $B^2$ are legs downwardly extending from the member B and fastened to apertures $A^2$ in the member A. The legs $B^2$ may be stamped out of the member B leaving apertures $B^3$ which are filled by upward projections $A^3$ of the member A.

The parts are kept in the position in which they are shown in Figure 3, as by the circumferential member C which is provided with a ledge or ridge $C^1$ or a circumferential indentation $C^2$, or both, at a distance somewhat above the bottom of the member C. The member C is herein shown as circular in cross-section, the ends being drawn together by any suitable releasable catch or securing means. I show, for example, a hook $C^4$ pivoted as at $C^5$ to the member C and pivoted as at its opposite end as at $C^6$ to a locking lever $C^7$ which is itself pivoted as at $C^8$ to an opposite end of the member C. The two ends of the member C are shown as overlapping as at $C^9$. It will be understood that when the parts are in the position in which they are shown in Figures 1, 2 and 3 the cake batter to be cooked is poured into the pan which is sufficiently tight to act as if it were solid. Note that the legs $B^2$ are shorter than the downward extension $C^{10}$ of the member C. The cake can thus be readily inserted into or removed from the oven. When the cooking is completed the user will release the catch and cause an expansion of the member C into the position in which it is shown in dotted line in Figure 4. The lower member A will then drop, as shown in Figure 4. If it does not drop it can readily be wedged down by inserting a knife between it and the member B. In general it will drop. When in the position in which it is shown in Figure 4 it releases the bottom of the cake which is then subjected to cooling, being spaced above the supporting surface, as by the legs $B^2$ and being given access to the air as by the apertures $B^1$. The user can lift the cake bodily, and with it the member B and put it on a shelf to cool and the cake can even be served on the member B.

Referring to the form of Figures 7 and 8 I illustrate a solid flat bottom rectangular pan having side members D and a solid bottom member $D^1$. This bottom member $D^1$ is illustrated with upward projections $D^2$ corresponding to the upward projections $A^1$ of the member A. Superposed on the bottom member $D^1$ is the false bottom $D^3$ provided with apertures $D^4$ effective to receive the projections $D^2$. In order to raise and lower it I provide lifting elements $D^5$ with lower horizontal portions $D^6$ and upper outwardly extending portions $D^7$. The portions $D^7$ may be of such height as to permit the member $D^3$ to rest on the bottom. In Figures 7 and 8 I illustrate studs $D^8$ on the false bottom $D^3$ which penetrates slots $D^9$ on the members $D^6$. Thus the user, when the false bottom is withdrawn by employment of the members $D^5$, can readily free the members $D^5$ from the false bottom and the cake. Note also that the members $D^5$ fit in indentations $D^{10}$ in the side elements D, whereby they do not affect or mar the shape of the cake.

Referring to Figure 9 I may employ, if I wish, in the place of the legs B², legs in the form of pins B²⁰ fastened to apertures B²¹.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In a cake drier, a compound bottom member including one element provided with a plurality of apertures and another element including interpenetrating portions filling and closing said apertures and conforming to the plane of the surface of the other element, said bottom elements being freely separable when released, and a circumferential side member surrounding said compound bottom member, said side member being adapted, when in operative position, to hold the compound bottom member against movement in relation to the circumferential member and to hold the individual elements of the compound bottom member against movement in relation to each other, said side member being readily removable from the compound bottom member.

2. In a cake drier, a compound bottom member including one element provided with a plurality of apertures and another element including interpenetrating portions filling and closing said apertures and conforming to the plane of the surface of the other element, said bottom elements being freely separable when released, and a circumferential side member surrounding said compound bottom member, said side member being adapted, when in operative position, to hold the compound bottom member against movement in relation to the circumferential member and to hold the individual elements of the compound bottom member against movement in relation to each other, and means for extending the circumferential length of the side member.

3. In a cake drier, a compound bottom member including one element provided with a plurality of apertures and another element including interpenetrating portions filling and closing said apertures and conforming to the plane of the surface of the other element, said bottom elements being freely separable when released, and a circumferential side member surrounding said compound bottom member, said side member being readily removable from the compound bottom member and being adapted, when in operative position, to hold the compound bottom member against movement in relation to the circumferential member and to hold the individual elements of the compound bottom member against movement in relation to each other, one of said elements being provided with spacing means adapted to space it upwardly from a supporting surface when the bottom member is released from the side member.

4. In a cake drier, a circumferential side member, and a compound bottom member, readily removable as a whole from the side member, said bottom member including an element provided with a plurality of apertures and an element including interpenetrating portions filling and closing said apertures, the circumferential side member being adapted normally to maintain said elements in fixed relative position.

5. In a cake drier, a circumferential side member, and a compound bottom member removable as a whole from the side member, said bottom member including an element provided with a plurality of apertures and an element including interpenetrating portions filling and closing said apertures, the circumferential side member being adapted normally to maintain said elements in fixed relative position, and means for increasing the effective length of the circumferential side member and thereby releasing the compound bottom member.

6. In a cake drier, a compound bottom member including one element provided with a plurality of apertures and another element including interpenetrating portions filling and closing said apertures and conforming to the plane of the surface of the other element, said bottom elements being freely separable when released, and a circumferential side member surrounding said compound bottom member and readily removable therefrom, said side member being adapted, when in operative position, to hold the compound bottom member against movement in relation to the circumferential member and to hold the individual elements of the compound bottom member against movement in relation to each other, one of said elements being provided with spacing means adapted to space it upwardly from a supporting surface when the bottom member is released from the side member, said side member being provided with a channel adapted to receive the edges of both elements of the bottom member.

PETER A. JANSSENS.